United States Patent [19]
Kawano et al.

[11] Patent Number: 6,157,785
[45] Date of Patent: Dec. 5, 2000

[54] ROLL-FILM CAMERA

[75] Inventors: Kiyoshi Kawano, Saitama; Yutaka Ohsawa, Tokyo, both of Japan

[73] Assignee: Asahi Kogaku Kogyo Kabushiki Kaisha, Tokyo, Japan

[21] Appl. No.: 09/296,601

[22] Filed: Apr. 23, 1999

[30] Foreign Application Priority Data

Apr. 27, 1998 [JP] Japan .................................. 10-116738

[51] Int. Cl.⁷ .............................. G03B 17/24; G03B 1/02
[52] U.S. Cl. .......................... 396/315; 396/318; 396/411; 396/413; 396/418
[58] Field of Search .................................... 396/310, 315, 396/318, 411, 413, 418, 538, 317, 316

[56] References Cited

U.S. PATENT DOCUMENTS 5,124,735  6/1992  Tsukahara et al. ..................... 396/318
5,918,083  6/1999  Aoki et al. ............................. 396/538

*Primary Examiner*—Alan A. Mathews
*Attorney, Agent, or Firm*—Greenblum & Bernstein, P.L.C.

[57] ABSTRACT

A roll-film camera for receiving a roll-film is disclosed which includes: a pair of spool compartments, each of which the roll-film can be placed in; a reversible film winding mechanism which rotates a spool placed in one of the pair of spool compartments in which the roll-film is not placed to wind a film of the roll-film onto the spool when the roll-film is placed in the other of the pair of spool compartments, wherein a film winding direction of the reversible film winding mechanism can be reversed depending on which one of the first and second spool compartments the roll film is loaded into; a photographic-data imprinting device for imprinting photographic data on the film; and a controller for controlling the photographic-data imprinting device to imprint the photographic data on the film in different arrangements depending on the winding direction of the film.

16 Claims, 13 Drawing Sheets

Code

Dot Imprinting Order

Film Winding Direction

Code

Dot Imprinting Order

Film Winding Direction

Matrix-array of Dots

Dot Imprinting Order

ROLL-FILM CAMERA

BACKGROUND OF THE INVENTION

1. Field of the Invention

The present invention relates to a roll-film camera that is designed to use a roll-film (e.g., Brownie film) and provided with a photographic-data imprinting device for imprinting various photographic information such as the date of photography, shutter-speed information, exposure-value information, etc., on each picture frame.

2. Description of the Related Art

The medium-format cameras (e.g., roll-film cameras) are generally designed to use roll-film. The most popular roll-films are 120/220 and 620 format films, commonly known as Brownie films. The 120 and 620 format films have an opaque paper backing and is supplied wound onto an open spool (rather than in a light-tight cassette). 220 format film is supplied wound onto an open spool without backing. When a new roll of Brownie film is loaded in a medium-format camera, the film is firstly placed in the film compartment (for example, in the left compartment) and subsequently the end of the film leader is inserted into the slot in the film take-up spool which is previously positioned in the spool compartment (in the right compartment). Thereafter, the film take-up spool is driven to rotate in a film-winding direction to wind the film on the film take-up spool. The film take-up spool can be driven manually or driven by a motor. The film is wound onto the film take-up spool, frame by frame, each time a picture is taken. After taking the last exposure, the film is further wound onto the film take-up spool until the film is entirely wound onto the film take-up spool. Thereafter, the film, together with the spool (which was originally a vacant spool), is taken out of the spool compartment. Consequently, a vacant spool, on which unexposed film was originally wound, is left in the film compartment. This vacant spool is used as film take-up spool for the subsequent photographing when a new roll-film is loaded into the camera.

In a camera that uses Brownie film, every time a new roll-film is loaded into the camera, the vacant spool left in the film compartment needs to be taken out therefrom to be subsequently placed in the spool compartment before the new roll-film is placed in the film compartment, which is troublesome and time-consuming. Accordingly, it is difficult to replace an exposed roll-film with a new one in a quick manner, possibly leading to missing a photographic opportunity.

A photographic-data imprinting device for imprinting various photographic information such as the date of photography, shutter-speed information, exposure-value information, etc., on each picture frame is well-known. Photographic information is imprinted for example on each frame outside the rectangular image plane thereof in the vicinity of either lateral edge of the film. As a photographic-data imprinting device for roll-film cameras, a light emitter (data-imprinting light emitter) provided with an array of tiny light emitters arranged in a straight line for imprinting a character or graphic symbol in the form of a dot matrix is used. Each tiny emitter of the data-imprinting light emitter is sequentially turned ON and OFF in accordance with photographic information which is to be imprinted while the film is wound, thereby each character or graphic symbol of photographic information is imprinted on the film as a matrix-array of tiny dots.

A conventional photographic-data imprinting device for roll-film cameras will be hereinafter discussed with reference to FIGS. 17 and 18. FIG. 17 shows part of a roll-film camera provided with a photographic-data imprinting device, while FIG. 18 shows characters in the form of a matrix-array of dots which are imprinted on a film by the photographic-data imprinting device. A camera body 200 is provided, between the film and spool compartments (not shown), with a rectangular aperture 210 which forms the limits of each frame exposed. The camera body 200 is provided on upper and lower sides of the aperture 210 with an upper pair of inner and outer film guide rails 910 and 900 and a lower pair of inner and outer film guide rails 230 and 220, respectively. A data-imprinting light emitter 240 is positioned in the vicinity of the aperture 210 between the inner and outer guide rails 230 and 220 of the lower pair. The data-imprinting light emitter 240 is composed of an array of seven LEDs D0, D1, D2, D3, D4, D5 and D6 which are aligned in a direction perpendicular to the winding direction of the film (the horizontal direction as viewed in FIG. 17). A controller (not shown) provided in the camera selectively turns the seven LEDs D0 through D6 ON and OFF while synchronizing the light emissions thereof with the film feeding speed to thereby imprint a character or graphic symbol in the form of a matrix-array of dots on the film.

FIG. 19 shows an example of the particular case where the photographic data of the shutter speed "1/500 sec." and the F-number "F2.8" are imprinted on a film 4 to correspond to a rectangular exposed image EI while the film 4 is wound in the direction shown by an arrow "B" in FIG. 17 (i.e, in the direction to the right as viewed in FIG. 19). FIG. 18 is an enlarged plan view of the characters of the F-number "F2.8" imprinted on the film 4 shown in FIG. 19. In FIG. 18, exposed dots (imprinted dots) and unexposed dots (blank dots) are represented by black-square dots "■" and white-square dots "□", respectively; and each vertical array of seven square dots corresponds to the seven LEDs D0 through D6, respectively. In FIG. 18, the matrix-array of square dots which together form the characters of the F-number "F2.8" are sequentially imprinted by ON/OFF emissions of the seven LEDs D0 through D6 from the right end ① shown in FIG. 18 to the left end while the ON/OFF emissions of the seven LEDs D0 through D6 are synchronized with the feeding speed of the film 4 in the direction "B". Consequently, as shown in FIG. 19, the inverted characters "1/500 F2.8" are imprinted on the film 4 to correspond to the inverted exposed image EI. Therefore, when one puts the developed film strips in order with the photographed images thereof seen in an erect position, the imprinted photographic data can be read also in an erect position above the corresponding exposed image EI.

In the conventional data-imprinting device, as mentioned above, an array of LEDs are selectively turned ON and OFF while the light emissions thereof are synchronized with the film feeding speed to thereby imprint a character or graphic symbol in the form of a matrix-array of dots on the film. However, the aforementioned manner of imprinting a character or graphic symbol in the form of a matrix-array of dots on the film cannot be applied to the case where the film winding direction can be reversed. Namely, if the aforementioned data-imprinting control is simply adopted for the case where the film winding direction is opposite to the aforementioned film winding direction "B", vertical arrays of square dots are sequentially imprinted in the opposite direction, so that the photographic data would not be appropriately imprinted on film. FIG. 20 shows such a case where the photographic data of the shutter speed "1/500 sec." and the F-number "F2.8" are imprinted on the film 4 while the film is wound in the direction shown by an arrow "A" in FIG. 17

(i.e, in the direction to the left as viewed in FIG. 20). In this case the photographic data "1/500 F2.8" is imprinted as a mirror image thereof, so that the imprinted photographic data can be read properly from the reverse side of the film 4, not from the front side thereof, which is troublesome when reading the imprinted photographic data while seeing the photographed images on the film 4. Furthermore, when each frame of such a film 4 is developed, the photographic data for each frame is reversely imprinted on a photographic paper, which is not desirable.

In addition, according to a conventional photographic-data imprinting device for roll-film cameras, photographic data is imprinted immediately above each exposed image EI as the image thereon is viewed as an erect image (i.e., when the image shown in FIG. 19 is viewed upside down). Such photographic data is imprinted while the film is being wound by one frame after taking each shot, so that the photographic data is positioned immediately above the corresponding exposed image EI to correspond to approximately the median thereof in the film winding direction. Due to such control, if the film winding direction is reversed (i.e., the film is wound in the direction from right to left as viewed in FIG. 20), vertical arrays of dots are sequentially imprinted in the opposite direction, so that the photographic data is not appropriately imprinted on film as shown in FIG. 20. Furthermore, as can be seen in FIG. 20, the photographic data is imprinted extending over two adjacent frames (the corresponding exposed image EI and the following frame), rather than immediately above the corresponding exposed image EI, so that it is difficult to tell which of the two adjacent frames the imprinted photographic data belongs to.

SUMMARY OF THE INVENTION

An object of the present invention is to provide a roll-film camera designed to use a roll--film (e.g., Brownie film) which is provided with a photographic-data imprinting device for imprinting various photographic information such as the date of photography, shutter-speed information, exposure-value information, etc., on each picture frame, wherein the photographic-data imprinting device can correctly imprint photographic data on each frame of the film at an appropriate position thereon, regardless of the film winding direction.

To achieve the object mentioned above, according to an aspect of the present invention, there is provided a roll-film camera for receiving a roll-film, including: a pair of spool compartments, each of which the roll-film can be placed therein; a reversible film winding mechanism which rotates a spool placed in one of the pair of spool compartments in which the roll-film is not placed to wind a film of the roll-film onto the spool when the roll-film is placed in the other of the pair of spool compartments, wherein a film winding direction of the reversible film winding mechanism can be reversed depending on which one of the first and second spool compartments the roll film is loaded into; a photographic-data imprinting device for imprinting photographic data on the film; and a controller for controlling the photographic-data imprinting device to imprint the photographic data on the film in different arrangements depending on the winding direction of the film.

Preferably, the controller controls the photographic-data imprinting device to imprint the photographic data on the film in either an erect or an inverted arrangement depending on the film winding direction.

Preferably, a detector is provided for detecting which of the first and second spool compartments the roll-film is placed in.

Preferably, the detector includes first and second sensors positioned in the camera body to correspond to the first and second spool compartments, respectively.

Preferably, the photographic-data imprinting device includes an array of light emitters which are aligned in a straight line extending in a direction perpendicular to the film winding direction; wherein the controller selectively actuates the array of light emitters to emit light on the film while synchronizing light emissions of the array of light emitters with the feeding speed of the film.

Preferably a memory for storing a first data table and a second data table is included, each including data of characters representing the photographic data; wherein the controller reads out the photographic data from the first and second data tables when the film is wound in a first film winding direction and a second film winding direction, respectively, the second film winding direction being opposite to the first film winding direction; wherein the array of light emitters emit light in accordance with the photographic data read out of either the first data table or the second data table.

Preferably, the data of each character of the photographic data of the first data table is stored in the memory in a first order, and wherein the data of each character of the photographic data of the second data table is stored in the memory in a second order.

Preferably, the first and second data tables are stored in the memory; wherein the photographic data of the first and second data tables is imprinted on the film in an erect position and an upside-down position, respectively.

Preferably, the controller determines the film winding direction in accordance with results of detection of the first and second sensors, wherein the film winding mechanism rotates the spool to feed the film from one of the pair of spool compartments in which the roll-film is placed to the other of the pair of spool compartments in which the spool is placed.

Preferably, the film winding mechanism includes a motor having a drive shaft which can be driven in forward and reverse rotational directions to wind the film between the pair of spool compartments in a first and a second direction, respectively.

Preferably, the film winding mechanism includes a planetary gear mechanism.

Preferably, the photographic data includes at least one of the following: date of photography, shutter-speed, exposure value and the focal-length.

Preferably, the camera includes a camera body having an aperture which forms the limits of each frame of the film exposed, wherein the camera body includes a through-hole formed outside of the aperture and in the close vicinity of the aperture on a lower lateral side thereof, and the array of light emitters emit light to the film through the through-hole to imprint the photographic data on the film.

Preferably, the photographic-data imprinting device includes a prism.

According to another aspect of the present invention, there is provided a roll-film camera for receiving a roll-film, including: a pair of spool compartments, each of which the roll-film can be placed therein; a reversible film winding mechanism which rotates a spool placed in one of the pair of spool compartments in which the roll-film is not placed to wind a film of the roll-film onto the spool when the roll-film is placed in the other of the pair of spool compartments; a photographic-data imprinting device for imprinting photographic data on the film; and a controller for controlling the photographic-data imprinting device to imprint the photographic data on the film in a manner so that characters or symbols of photographing data are correctly recorded in a same direction, when viewed from the front side or reverse side of the film, regardless of a winding direction of the film.

According to another aspect of the present invention, there is provided a roll-film camera for receiving a roll-film, including: a pair of spool compartments, each of which the roll-film can be placed therein; a reversible film winding mechanism which rotates a spool placed in one of the pair of spool compartments in which the roll-film is not placed to wind a film of the roll-film onto the spool when the roll-film is placed in the other of the pair of spool compartments; a photographic-data imprinting device for imprinting photographic data on the film; and a controller for controlling the photographic-data imprinting device to imprint the photographic data on the film within a predetermined area which correctly corresponds to each frame to be exposed on the film regardless of the winding direction of the film.

Other aspects, objects and advantages of the invention will become apparent to one skilled in the art from the following disclosure and appended claims.

The present disclosure relates to subject matter contained in Japanese Patent Application No.10-116738 (filed on Apr. 27, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
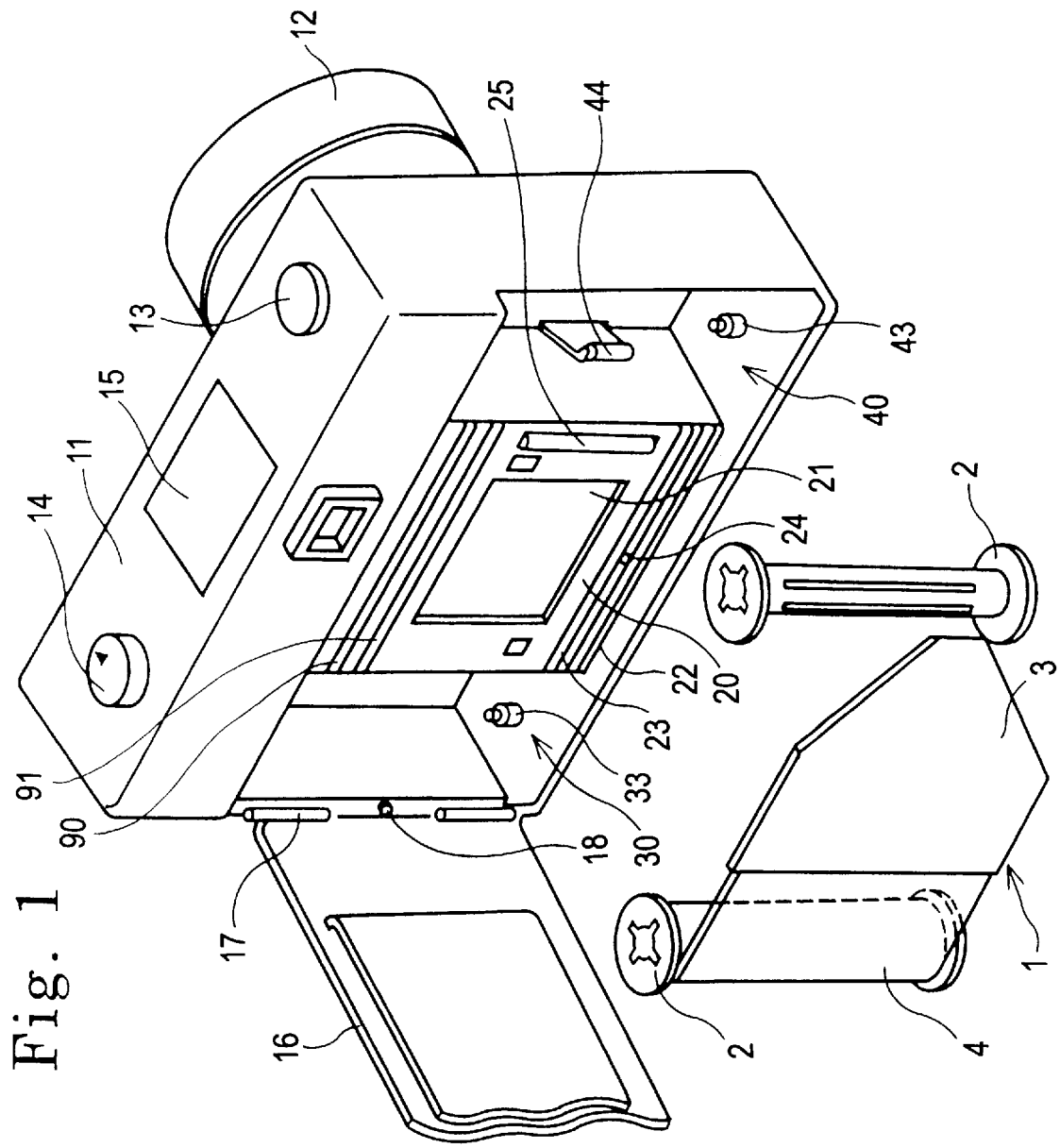
FIG. 1 is a perspective view of an embodiment of a roll-film camera according to the present invention.

FIG. 1 shows an embodiment of a medium-format roll-film camera provided with a photographic-data imprinting device, according to the present invention. The roll-film camera 11 is designed to use a roll-film; specifically, Brownie film. The camera 11 is shown in FIG. 1 with a back lid 16 thereof being widely open.

The camera 11 is provided on the front face thereof with a photographic lens 12. The camera 11 is provided on the upper face thereof with a release switch (release button) 13, a main switch (power button) 14 and a LCD panel 15. The shutter is released when the release switch 13 is depressed. Power source can be turned ON/OFF by operating the main switch 14. Various photographic information is displayed on the LCD panel 15.

The back lid 16 of the camera 11 is rotatably connected to a camera body 20 of the camera 11 via a hinge 17. The back lid 16 is opened as shown in FIG. 1 when a roll-film is loaded in or taken out of the camera 11. The camera is provided in the vicinity of the hinge 17 with a back-lid switch 18 for detecting whether the back lid 16 is open or closed. The back-lid switch 18 is turned ON when the back lid 16 is closed. In FIG. 1 the camera 11 is shown together with a conventional type of Brownie film 1, which can be used for the camera 11. The Brownie film 1 is provided with a spool 2, a ribbon-shaped film 4 and a backing paper 3. The film 4 supported on the backing paper 3 is rolled around the spool 2.

The camera 11 is provided, on the back of the camera body 20 at the approximate center thereof, with a rectangular aperture 21 which forms the limits of each frame exposed.

The camera body 20 is provided on upper and lower sides of the aperture 21 with an upper pair of inner and outer film guide rails 91 and 90 and a lower pair of inner and outer film guide rails 23 and 22, respectively. These two pairs of film guide rails are formed on the camera body 20 to extend in the film winding direction. The camera body 20 is provided on one and the other sides (right and left sides) of the aperture 21 with a first spool compartment 30 and a second spool compartment 40, respectively.

The camera 11 is provided with a data-imprinting light emitter 24 for imprinting various photographic information such as the date of photography, shutter-speed information, exposure-value information, focal-length information and other information on each picture frame. The data-imprinting light emitter 24 is positioned in the vicinity of the aperture 21 between the inner and outer guide rails 23 and 22 of the lower pair.

The camera 11 is provided, on the camera body 20 between the aperture 10 and the second spool compartment 40, with a friction roller 25 on which the film 4 lies to contact therewith. The camera 11 is further provided in the camera body 20 with an electronic circuit (see FIG.7) which includes a control circuit. The electronic circuit controls the overall function of the camera 11, e.g., a film winding motor 57.

Figure 2:
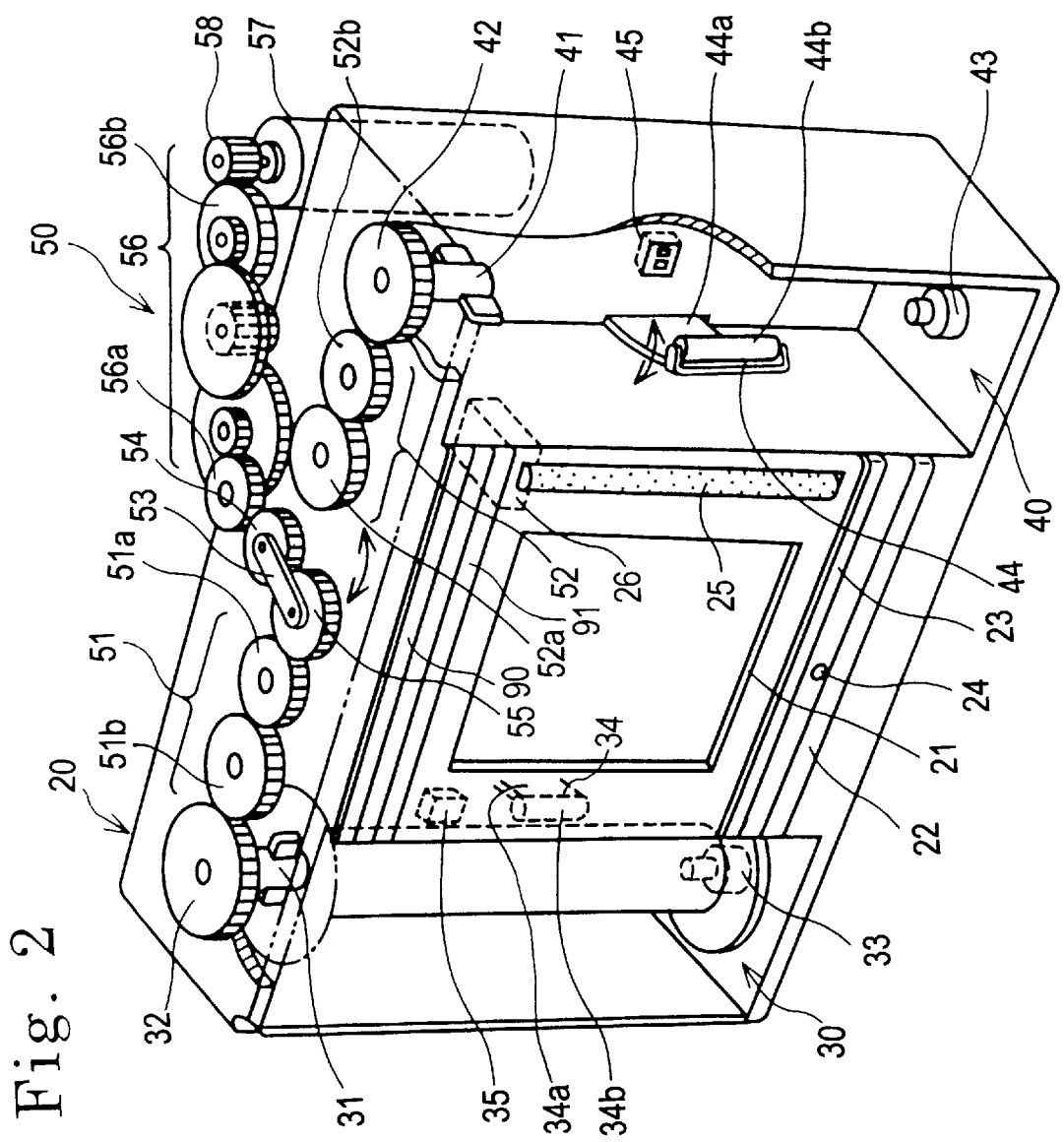
FIG. 2 is a partially cutaway view in perspective of the camera body of the roll-film camera shown in FIG. 1.

The camera 11 is provided in the camera body 20 with a film winding mechanism 50 (see FIG. 2). The film winding mechanism 50 is provided with a first engaging shaft 31 which projects into the first spool compartment 30 from the upper wall thereof to be coaxially engageable with the spool 2 when the spool 2 is placed in the first spool compartment 30. Likewise, the film winding mechanism 50 is provided with a second engaging shaft 41 which projects into the second spool compartment 40 from the upper wall thereof to be coaxially engageable with the spool 2 when the spool 2 is placed in the second spool compartment 40.

The first engaging shaft 31 is provided at the upper end thereof with a gear 32. The film winding mechanism 50 is provided adjacent to the gear 32 with a first gear train (driven gear train) 51 consisting of a couple of gears 51a and 51b engaged with each other. The gear 32 stays in mesh with the gear 51b. Likewise, the second engaging shaft 41 is provided at the upper end thereof with a gear 42. The film winding mechanism 50 is provided adjacent to the gear 42 with a second gear train (driven gear train) 52 consisting of a couple of gears 52a and 52b engaged with each other. The gear 41 stays in mesh with the gear 52b. The first and second gear trains 51 and 52 are arranged along the film winding direction of the camera 11 so that the gears 51a and 52a are positioned above the aperture 21 at substantially the central position thereof in the film winding direction to be apart from each other by a predetermined distance.

The film winding mechanism 50 is provided with a planetary gear mechanism which consists of a sun gear 54, a planet gear 55 and a swing arm 53. The sun gear 54 stays in mesh with the planet gear 55 and a final gear 56a of a third gear train 56. The planet gear 55 stays in mesh with and is rotatable around the sun gear 54. One end and the other end of the rotatable arm 53 are pivoted to the rotational axis of the sun gear 54 and the rotational axis of the planet gear 55, respectively, so that the planet gear 55 is rotatable about the sun gear 54 without disengaging therefrom. The swing arm 53 can swing about the rotational axis of the sun gear 54 in a plane which includes the first and second gear trains 51 and 52.

The film winding mechanism 50 is provided with the aforementioned third gear train (drive gear train) 56 which consists of four gears having different diameters. A first gear 56b of the third gear train 56 is in mesh with a pinion 58 fixed onto a drive shaft of the film winding motor 57. In the illustrated embodiment, the arrangement constituting the first gear train 51 and the gear 32 is identical to the arrangement constituting the second gear train 52 and the gear 42. These two arrangements are arranged symmetrical with respect to the rotational axis of the sun gear 54. According to this arrangement, the drive force of the film that is produced by the motor 57 and also the film winding speed become identical in either film winding direction. Consequently, a user would not recognize a difference in feeling between the film winding operations in opposite directions.

Figure 3:
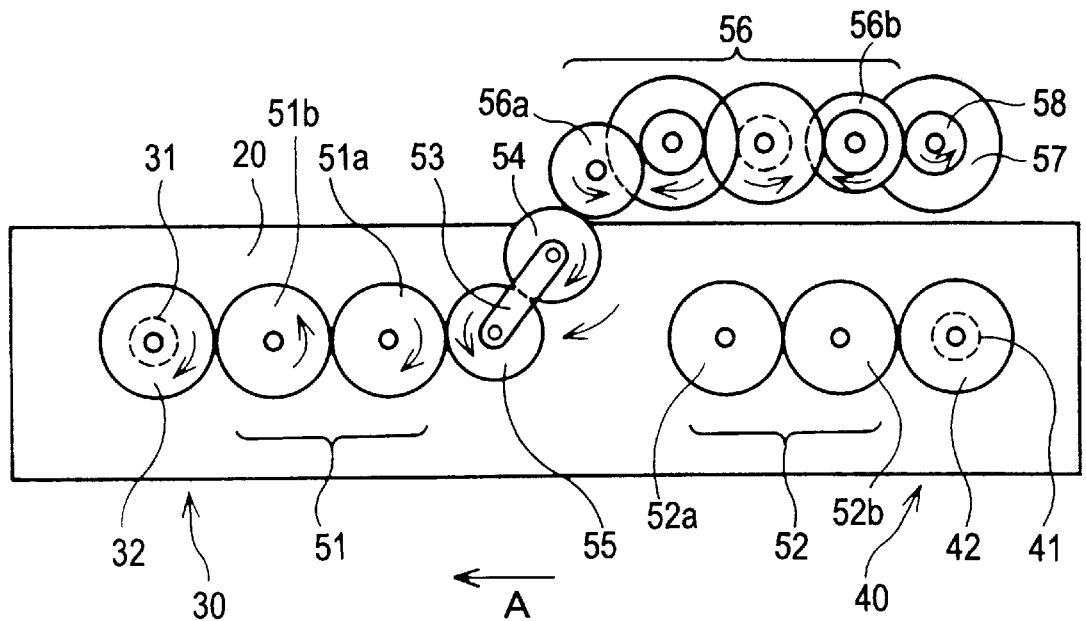
FIG. 3 is a schematic plan view of the camera body shown in FIG. 2 for illustrating an operation of the film winding mechanism of the roll-film camera shown in FIG. 1.
Figure 4:
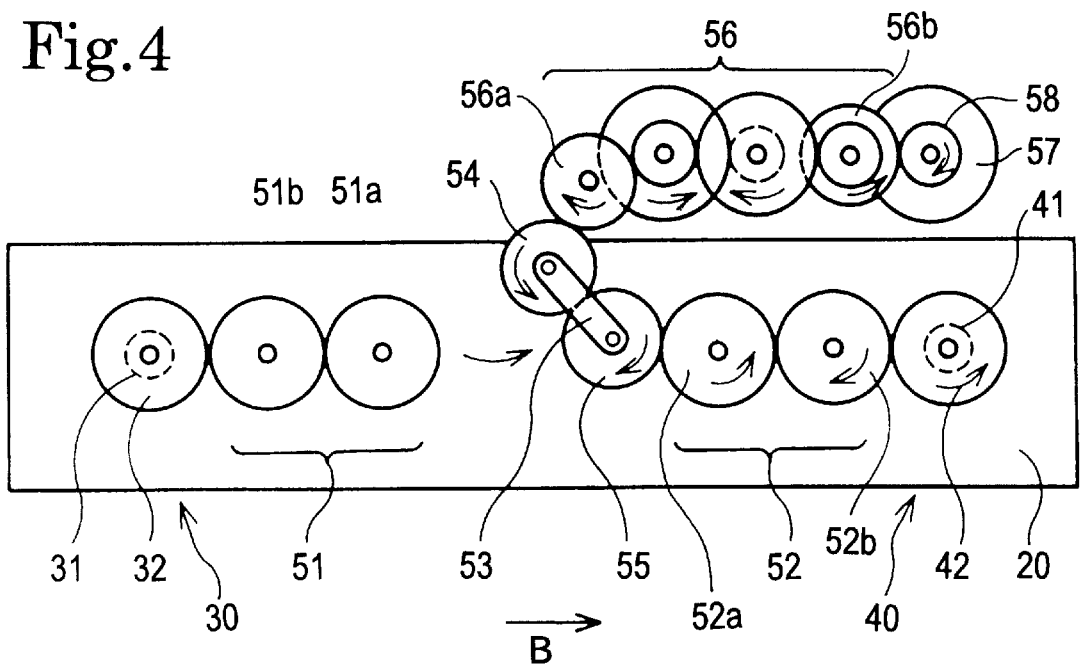
FIG. 4 is a schematic plan view of the camera body shown in FIG. 2 for illustrating an operation of the film winding mechanism of the roll-film camera shown in FIG. 1.

FIGS. 3 and 4 show plan views of the film winding mechanism 50 in different positions. In the case where the drive shaft of the film winding motor 57 rotates counterclockwise as shown in FIG. 3, the rotational force is transmitted to the sun gear 54 via the pinion 58 and the third gear train 56. Consequently, the sun gear 54 rotates clockwise which is opposite to the rotation direction of the final gear 56a, due to the engagement of the final gear 56a of the third gear train 56 and the sun gear 54, so that the swing arm 53 swings clockwise. As a result of the swing movement of the swing arm 53, the planet gear 55 engages with the first gear 51a of the first gear train 51, so that the rotational force of the sun gear 54 is transmitted to the first gear train 51. Consequently, the gear 32 rotates clockwise to thereby rotate the first engaging shaft 31 clockwise. Consequently, the film is wound in the direction toward the first spool compartment 30, i.e., in the direction shown by an arrow "A" in FIG. 3.

In the case where the drive shaft of the film winding motor 57 rotates clockwise as shown in FIG. 4, the sun gear 54 is rotated counterclockwise by the third gear train 56, so that the swing arm 53 swings counterclockwise. As a result, the planet gear 55 engages with the first gear 52a of the second gear train 52, so that the gear 42 rotates counterclockwise to thereby rotate the second engaging shaft 41 counterclockwise. Consequently, the film is wound in the direction toward the second spool compartment 40, i.e., in the direction shown by an arrow "B" in FIG. 4. Accordingly, in the film winding mechanism 50, either one of the first and second engaging shafts 31 and 41 can be selectively driven to rotate by changing the rotational direction of the drive shaft of the film winding motor 57. When one of the engaging shafts (31 or 41) is driven to wind the film on the corresponding spool 2, the other engaging shaft and the gear train associated therewith are free to rotate since the gear train which is engaged by the other engaging shaft is disengaged from the planet gear 55.

As can be seen in FIG. 2, spool support shafts 33 and 43 are provided at the lower surfaces of the first and second spool compartments 30 and 40 and are aligned with the axes of the engaging shafts 31 and 41, respectively. The first and second engaging shafts 31 and 41 and the spool support shafts 33 and 43 make it possible to rotatably support the spools (first and second spools) 2 loaded in the spool compartments 30 and 40. The engaging shafts 31 and 41 are spaced from the median of the aperture 21 in the lateral direction at an equi-distance, i.e., the engaging shafts 31 and 41 are arranged in a line-symmetry with respect to the medial vertical line of the aperture 21. The spool compartments 30 and 40 are respectively provided on their inner wall surfaces with film pressing rollers 34 and 44 which are brought into elastic contact, in the radial direction, with the outer surface of the film which is wound onto one of the spools 2 to thereby prevent the film being loosened. The film pressing rollers 34 and 44 are provided with roller elements 34*b* and 44*b* which are rotatably supported at the front ends of elastically deformable arms 34*a* and 44*a* which are secured at their one end to the camera body, so that the roller elements 34*b* and 44*b* can be brought into elastic contact with the film surface due to the resilience of the elastically deformable arms 34*a* and 44*a*, respectively.

The first and second spool compartments 30 and 40 are also provided on their inner wall surfaces with first and second photo-reflectors (first and second spool compartment sensors) 35 and 45 separate from the film pressing rollers, which serve as film sensors, corresponding to the spools 2 loaded in the respective spool compartments. The photo-reflectors 35 and 45 are identical and are each provided therein with a pair of light emitting diode (LED) and photo diode (PD). In each spool compartment, light emitted from the light emitting diode is reflected by the outer surface of the film 4 loaded in the spool compartment and is received by the photo diode, thereby the photo-reflector 35 (45) is turned ON. Consequently, it can be detected by the photo-reflector that the film 4 is loaded in the spool compartment or that the film is wound onto the spool 2 positioned in the spool compartment. If no film is loaded, for example, if only the spool 2 exists in the spool compartment, light emitted from the light emitting diode of the photo-reflector 35 (45) does not received by the corresponding photo diode and hence the photo-reflector 35 (45) is OFF.

The friction roller 25, which is provided between the aperture 21 and the second spool compartment 40, is brought into contact with the inner surface of the film 4 when the film 4 is wound up, so that the friction roller 25 (i.e., the shaft of the friction roller) is rotated due to the friction caused by the movement of the film during the winding operation. The friction roller 25 is provided on its one end with a pulse generator (circuit) 26 which generates pulse signals in accordance with the rotation of the friction roller 25. The pulse generator 26 can be composed of, for example, a magnet (not shown) which is rotated in accordance with the rotation of the shaft of the friction roller 25 and a Hall element (not shown) disposed in the vicinity of the magnet, so that the power produced by the Hall element due to a change in the magnetic flux density in accordance with the rotation of the magnet is output as pulse signals. Alternatively, the pulse generator can be composed of a light interception plate which is rotated in accordance with the rotation of the shaft of the friction roller 25 and a photo-detector having sensor elements disposed on opposite sides of the light interception plate, so that pin holes formed in the light interception plate can be detected by the photo-detector which generates pulse signals. Consequently, the amount of rotation of the friction roller 25 (i.e., the amount of the winding of the film) is detected by counting the number of pulses output from the pulse generator 26.

Figure 5:
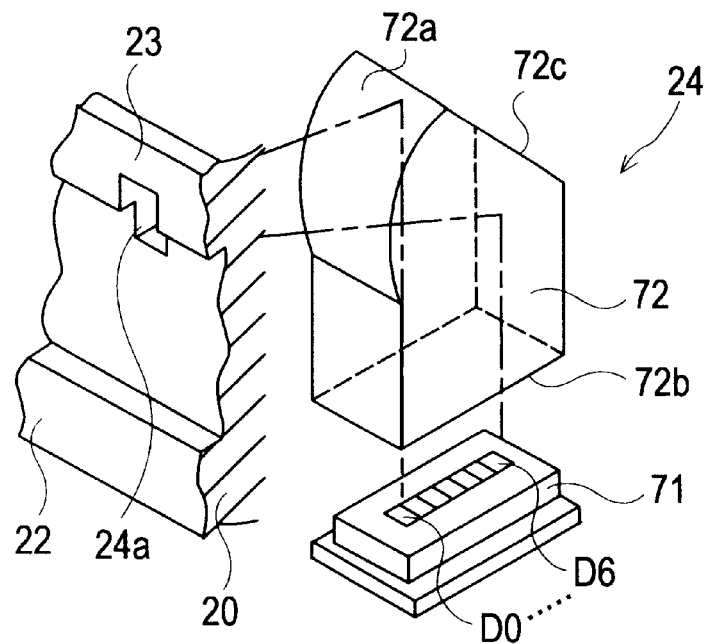
FIG. 5 is a fragmentary perspective view of the data-imprinting light emitter of the roll-film camera shown in FIG. 1.
Figure 6:
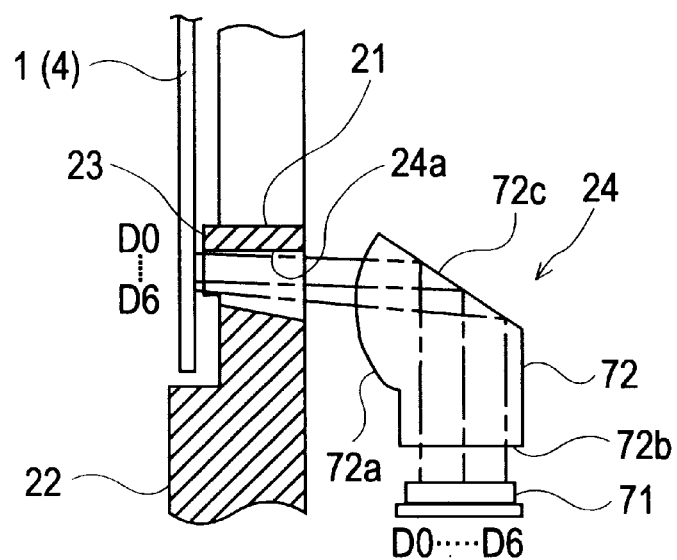
FIG. 6 is a cross-sectional view of the data-imprinting light emitter shown in FIG. 5.

As shown in FIGS. 5 and 6, the data-imprinting light emitter 24 is composed of a light emitter 71 and a prism 72. The light emitter 71 is provided with an array of seven LEDs D0, D1, D2, D3, D4, D5 and D6 which are aligned along a straight line in a direction perpendicular to the winding direction of the film 4. The data-imprinting light emitter 24 is disposed in the camera body 20 behind a through-hole 24*a* which is formed on the camera body 20 between the inner and outer guide rails 23 and 22 at the substantially median of the aperture 21 in the lateral direction thereof. The prism 72 is shaped to have an exit surface 72*a*, an incident surface 72*b* and a reflecting surface 72*c* and is disposed in the camera body 20 behind the through-hole 24*a* above the light emitter 71. The light emitted from the light emitter 71 is incident on the incident surface 72*b* to enter into the prism 72. Subsequently, the incident light is reflected by the reflecting surface 72*c* towards the exit surface 72*a* to be incident on the film 4 through the through-hole 24*a*. The exit surface 72*a* is formed as a convex surface to project a converge light therefrom so that light rays emitted by the seven LEDs D0 through D6 are respectively converged onto the film 4 as seven spots or dots which are aligned along a straight line extending perpendicular to the film winding direction. The light emitter 71 is controlled by a control circuit 60 (see FIG. 7).

Figure 7:
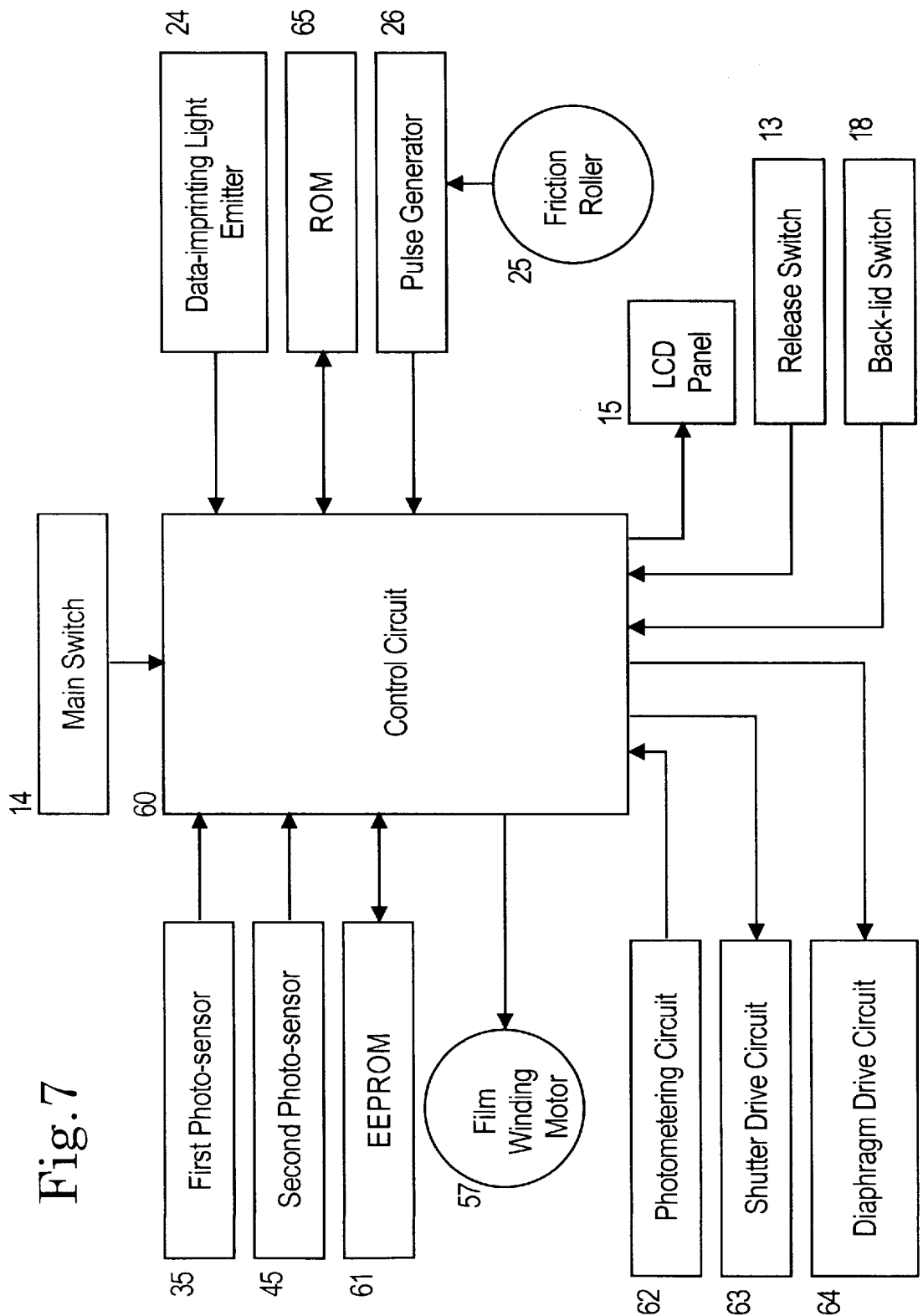
FIG. 7 is a block diagram of an electronic circuit provided in the roll-film camera shown in FIG. 1.

FIG. 7 shows a block diagram of the electronic circuit provided in the camera body 20. The ON/OFF data of the various switches (including the main switch 14, the back-lid switch 18, and the release switch 13) is input to the control circuit 60. The detection signal which is issued when it is detected by the first and second photo-reflectors 35 and 45 that the film is loaded in the first and second spool compartments, respectively, is also supplied to the control circuit 60. The pulse signals which are generated by the pulse generator 26 in accordance with the rotation of the friction roller 25 during the film winding operation are also input as a film winding amount signal to the control circuit 60. The control circuit 60 performs a predetermined arithmetic operation, based on the above-mentioned signals input thereto; reads/writes the data from or into the EEPROM 61; and controls the rotation of the film winding motor 57 in accordance with the calculation results.

The electronic circuit is provided with a ROM 65 which is connected to the control circuit 60. First and second data tables "A" and "B" are prestored in the ROM 65. Each data table includes data of various characters representing photographic data to be imprinted on the film. Photographic data is imprinted as corresponding characters represented by a matrix-array of dots. Photographic data represented by a matrix-array of dots is formed by a series of longitudinal lines which are each made of seven dots 0 through 6 respectively imprinted by emissions of the seven LEDs D0 through D6 (see FIG. 11). Although details will be discussed hereinafter, for the purpose of data processing, the seven dots are divided into two groups: a 3-dot group (0 through 2), and a 4-dot group (3 through 6). Each dot group (constituting a total of seven dots 0 through 6) is represented by hexadecimal notation (though the 3-dot group is only represented by the numbers 0 through 7). Each character of photographic data is formed by a matrix-array of seven dots by seven dots (7×7). Namely, each character is formed by seven vertical arrays of seven dots 0 through 6. Each of the first and second data tables "A" and "B" includes the same photographic data. However, data of seven vertical arrays of seven dots 0 through 6 of each character of photographic data is stored as an array in the ROM 65 in one direction in a regular order in the first data table "A", while the same is stored as an array in the ROM 65 in the opposite direction in the reverse order in the second data table "B".

In the case where the control circuit 60 controls the light emitter 71 to imprint photographic data on the film 4, the control circuit 60 firstly selects either the first or second data table "A" or "B" stored in the ROM 65 and controls the light emitter 71 so that the seven LEDs D0, D1, D2, D3, D4, D5 and D6 thereof emit light therefrom in a certain order while the film 4 is wound in accordance with the photographic data which is to be imprinted and the selected data table "A" or "B". The control circuit 60 counts the number of pulse signals output from the pulse generating circuit 26 to determine the film feeding speed and length to control the light emitter 71 to emit light synchronously in accordance with the determined film feeding speed and position. The control circuit 60 is connected with the LCD panel 15 and controls the same to indicate necessary photographic data thereon depending upon the requirements. The electric circuit is further provided with a photometering circuit 62, a shutter drive circuit 63 and a diaphragm drive circuit 64 which are each connected to the control circuit 60.

In the camera constructed as above, when a new roll of Brownie film 1 is loaded in one of the first or second spool compartments 30 or 40 upon film replacement, the film can be wound onto the vacant spool placed in the other compartment, and consequently, the photographing operation for the loaded film can be carried out. For instance, when all the frames of the film loaded in the first spool compartment 30 have been exposed in previous photographing operations, the film has been entirely wound onto the spool 2 positioned in the second spool compartment 40, so that the spool 2 positioned in the first spool compartment 30 is vacant of the film. For subsequent photographing operations, the exposed film positioned in the second spool compartment 40 is removed and a new roll of Brownie film 1 is loaded in the second spool compartment 40. Thereafter, the leading end of the new film is inserted in the slit of the vacant spool 2 positioned in the first spool compartment 30, and the film is wound and fed toward the first spool compartment 30 at each photographing operation.

Conversely, when all the frames of the film loaded in the second spool compartment 40 have been exposed, the film is entirely wound onto the spool 2 positioned in the first spool compartment 30. Therefore, the spool 2 positioned in the second spool compartment 40 is vacant of film. For subsequent photographing operations, the exposed film in the first spool compartment 30 is removed and a new roll of Brownie film 1 is loaded in the first spool compartment, and the film is wound and fed toward the second spool compartment 40 at each photographing operation.

Hence, Brownie film can be loaded in either spool compartment 30 or 40 and can be exposed. As a result, the film replacement can be carried out easily and quickly. Furthermore, regardless of which spool compartment is used to receive a new Brownie film, desired photographic data can be properly imprinted on each frame by the data-imprinting light emitter 24 while the film 4 is wound after the frame is exposed.

Figure 8:
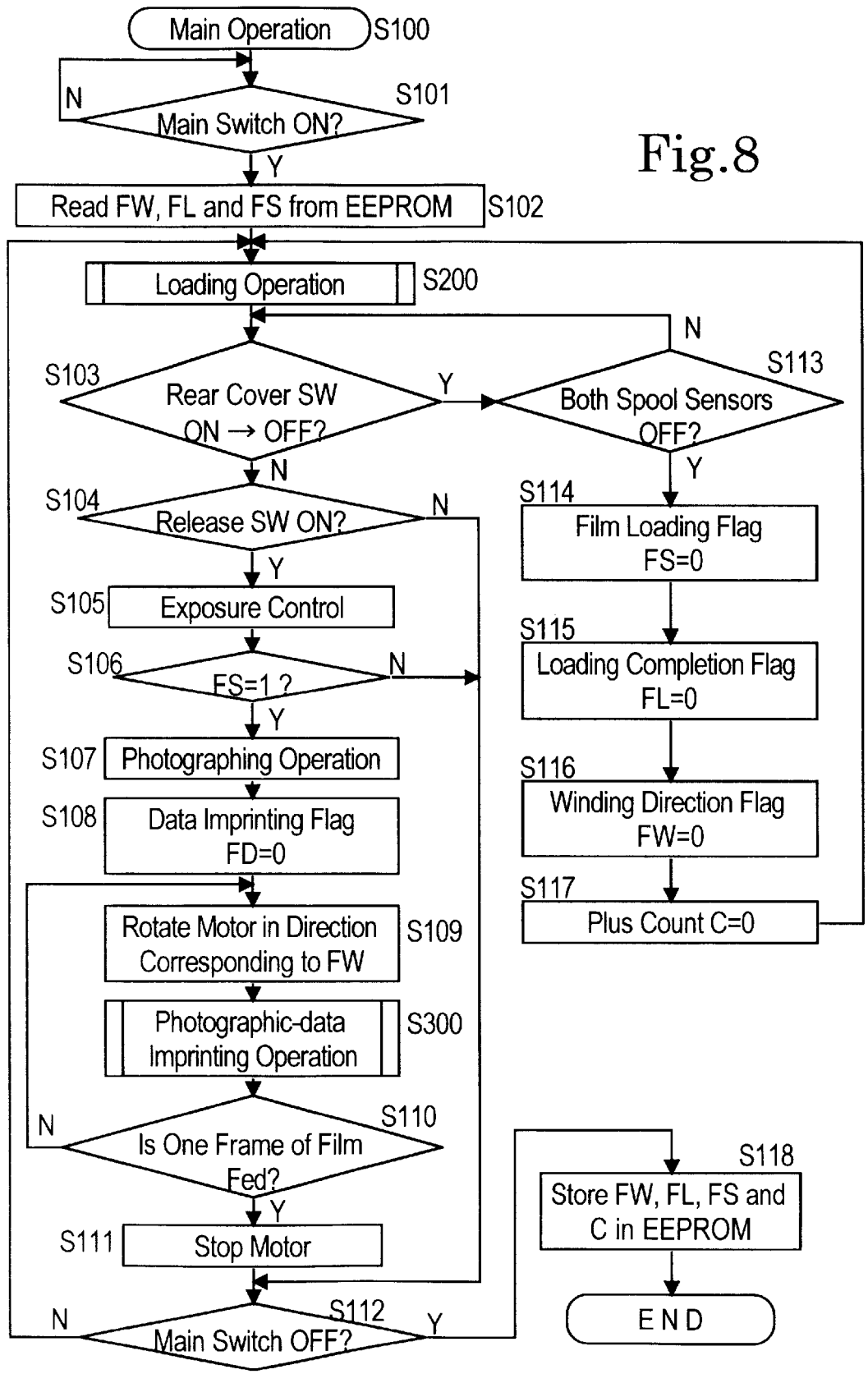
FIG. 8 is a flow chart which illustrates a main operation of the roll-film camera according to the present invention.
Figure 9:
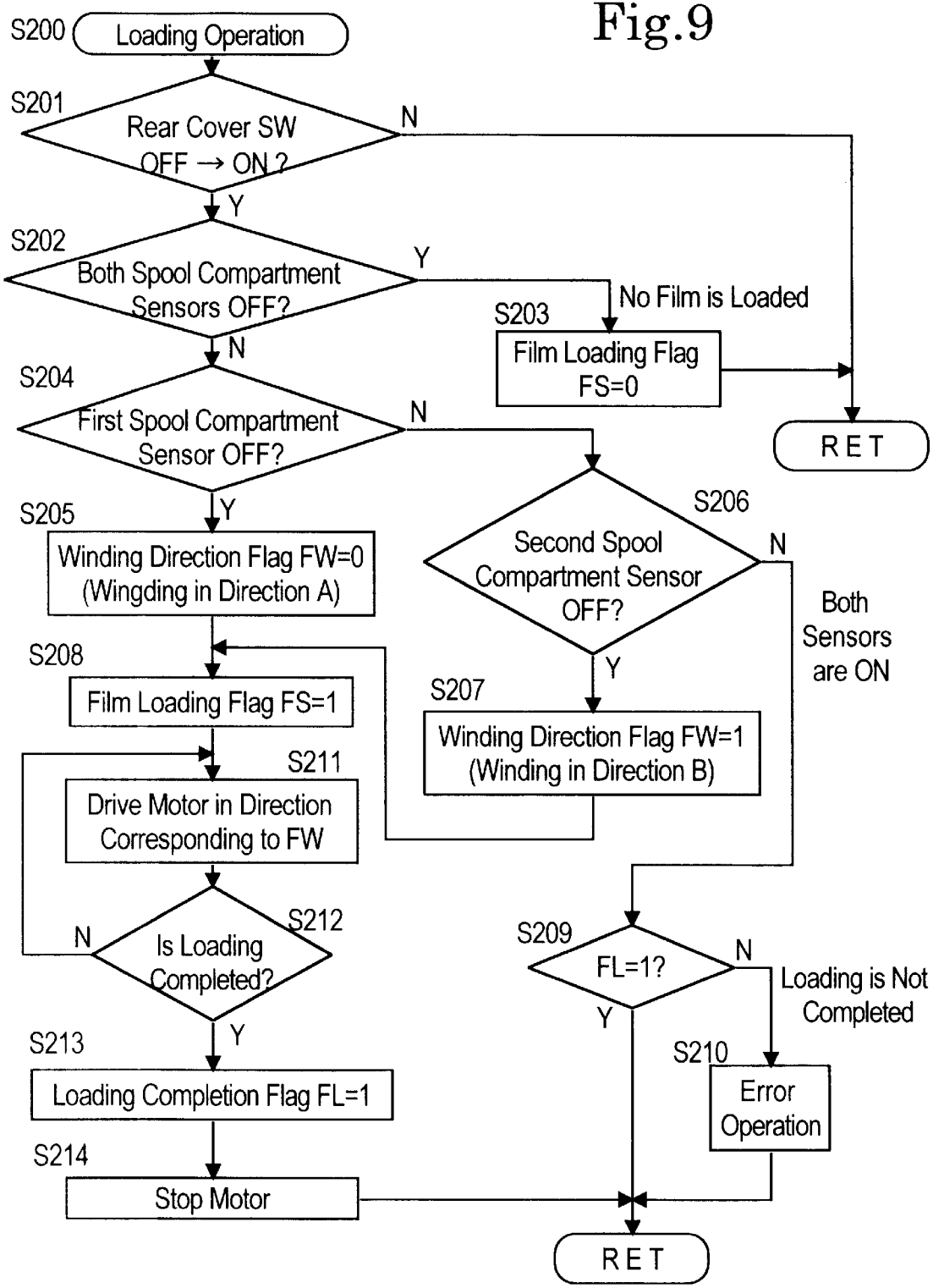
FIG. 9 is a flow chart which illustrates the film-loading operation shown in FIG. 8.
Figure 10:
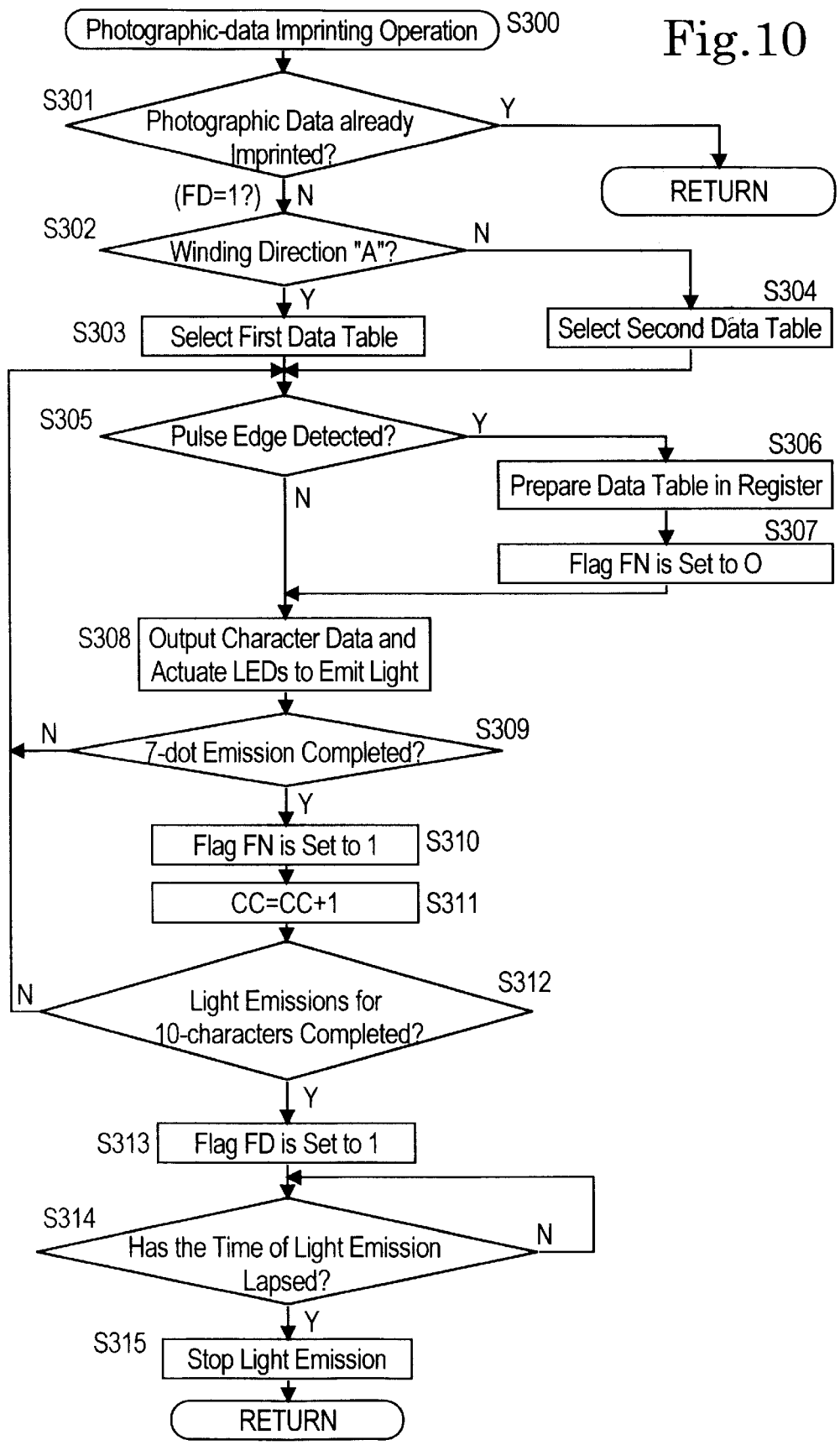
FIG. 10 is a flow chart which illustrates the data-imprinting operation shown in FIG. 8.

The photographing operation which includes the photographic-data imprinting operation will be hereinafter discussed with reference to the flow charts shown in FIGS. 8, 9 and 10.

The main operation (S100) starts when the main switch 14 is turned ON (S101). The control circuit 60 reads the winding direction flag FW, the film loading completion flag FL, and the film loading flag FS, stored in the EEPROM 61 (S102). Thereafter, the loading operation is carried out (S200). In the loading operation, as shown in FIG. 9, the re-closure of the back lid 16 which has been opened for the film replacement is detected when the back-lid switch 18 is turned ON from OFF (S201). Whether a roll-film is loaded in the first spool compartment 30 or in the second spool compartment 40 is detected by the photo-reflectors 35 and 45 provided in the respective spool compartments (S202). If both the photo-reflectors 35 and 45 are OFF, no roll-film is loaded. Consequently, the control circuit 60 sets the film loading flag FS=0 and the control is returned to the main operation (S203).

If one of the photo-reflectors 35 and 45 is turned ON, the state of the first photo-reflector 35 is determined (S204). If the first photo-reflector 35 is OFF, it is determined that a roll-film is loaded in the second spool compartment 40, so that the control circuit 60 sets the winding direction flag FW=0 to set the winding direction of the film toward the first spool compartment 30 from the second spool compartment 40 (S205). If the first photo-reflector 35 is ON, a check is made to determined whether the second photo-reflector 45 is OFF. If the second photo-reflector 45 is OFF (S206), the control circuit 60 sets the winding direction flag FW=1 to set the winding direction of the film toward the second spool compartment 40 from the first spool compartment 30 (S207). When the winding direction FW is set, it is determined that the film is loaded so that the film loading flag is set to be FS=1 (S208). If both the first and second photo-reflectors 35 and 45 are ON, a check is made to determine whether the film has been loaded (S209) (i.e., whether the loading completion flag FL is FL=1). If FL=1, the control is returned to the main operation. If FL=0, the error operation in which, e.g., a warning message or graphic symbol is indicated on the LCD panel 15, is carried out (S210). Thereafter, the control is returned to the main operation.

If the film loading flag FS is 1 (FS=1), the control circuit 60 drives the film winding motor 57 in accordance with the value of the winding direction flag FW (S211). Namely, if FW=1, the film winding motor 57 is driven to wind the film 4 into the second spool compartment 40. For example, in the arrangement shown in FIG. 4, the drive shaft of the film winding motor 57 is driven to rotate clockwise. Consequently, the planet gear 55 which is swung by the sun gear 54 through the third gear train 56 is engaged with the second gear train 52, so that the first engaging shaft 41 in the second spool compartment 40 is rotated counterclockwise. As a result, the film 4 of Brownie film 1 positioned in the first spool compartment 30 is fed in the direction "B" to be wound onto the spool 2 positioned in the second spool compartment 40. Consequently, the friction roller 25 is rotated, so that pulses are generated by the pulse generator 26. The control circuit 60 counts the number of pulses and detects that a predetermined amount of film 4 has been wound in accordance with the counted number of pulses. Consequently, the completion of the loading is detected (S212) and thereafter, the loading completion flag FL is set to 1 (FL=1) (S213) to stop the film winding motor 57 (S214). Thus, the loading operation at step S200 is completed and the control is returned to the main operation, i.e., the control proceeds to the operation at step S103.

After the loading operation at step S200 is completed, the control circuit 60 determines the state of the back-lid switch 18 (S103). If the back-lid switch 18 is not turned OFF (from ON) (the back lid 16 is closed), whether the release switch 13 is turned ON is checked (S104). If the release switch 13 is turned ON, the exposure operation is carried out (S105). Thereafter, if the film loading flag FS is 1 (FS=1), the photographing operation is carried out (S106, S107). After the photographic operation is completed, the data imprinting flag FD is set to 0 (FD=0) (S108). Thereafter, the drive shaft of the film winding motor 57 starts to rotate in the direction corresponding to the value of the winding direction flag FW (S109).

After the operation at step S109, control proceeds to the photographic-data imprinting operation (S300). FIG. 10 shows the flow chart of the photographic-data imprinting operation. The control circuit 60 determines the state of the data imprinting flag FD read out of the EEPROM 61. If the flag FD is 1 (FD=1), the photographic-data has been already imprinted, so that the control is returned to the main operation (S301). If the flag FD is 0 (FD=0), the photographic-data has not been imprinted, so that the control determines the state of the winding direction flag FW (S302). If the flag FW is 1 (FW=1), the film 4 is being wound in the direction "A", so that the control circuit 60 selects the first data table "A" stored in the ROM 65 (S303). If the flag FW is 0 (FW=0), the film 4 is being wound in the direction "B", so that the control circuit 60 selects the second data table "B" stored in the ROM 65 (S304). After the operation at step S303 or 304 is completed, the control circuit 60 inputs the photographic data, which is to be imprinted on a corresponding frame, from the selected data table "A" or "B", by each single character-data, to arrange the input data in order. In this particular embodiment, a maximum of ten characters can be imprinted on each frame.

If the control circuit 60 counts the number of pulse signals (which are output from the pulse generating circuit 26 in accordance with the rotation of the friction roller 25) to detect that the film 4 has started to wind (S305), photographic data which is read out of the selected data table "A" or "B" is registered in a register (not shown) (S306), while the one-character-imprint completion flag FN is set to 0 (FN=0) (S307). Thereafter, the aforementioned arranged input data of one character is output to the data-imprinting light emitter 24 so that the seven LEDs D0 through D6 of the light emitter 71 each emit light therefrom in accordance with the data of the first array of seven dots 0 through 6 (S308). Thereafter, it is determined whether or not the light emitter 71 has already completed the light emission thereof for imprinting one character on the film 4, i.e., whether or not all the seven arrays (a matrix-array of seven dots by seven dots) which together form one character have been exposed by the emission of the light emitter 71 (S309). If it is determined that the light emitter 71 has not yet completed the light emission thereof for imprinting one character on the film 4, control is returned to the operation at step S305, so that the operations from S305 to S308 are repeatedly carried out until all the seven arrays for one character have been completed to be exposed. If it is determined at step S309 that the light emitter 71 has completed the emissions for all the seven arrays of dots, it is assumed that all the seven arrays for one character have been exposed, so that the one-character-imprint completion flag FN is set to 1 (FN=1) (S310). Subsequently, the value of the counter of the number of characters (character counter) CC is increased by one (CC+1)(S311). Thereafter, in accordance with the value of the character counter CC, it is determined whether or not the operation of emitting light by the light emitter 71 for imprinting all the characters (maximum of ten characters) has been completed (S312). If it is determined that the emitting operation has not yet been completed, the control is returned to the operation at step S305 to repeat the operations from S305 to S312. If it is determined that the emitting operation has been completed, the data imprinting flag FD is set to 1 (FD=1) (S313). Thereafter it is determined whether the predetermined time of emission of the light emitter 71 has lapsed (S314). If it is determined that the emission time has exceeded the predetermined period of time, the control circuit 60 controls the light emitter 71 to stop emitting light (S315), and control is returned to the main operation.

It is determined whether the film 4 has been wound by one frame, in accordance with the number of pulses generated from the pulse generator 26 in accordance with the rotation of the friction roller 25 (S110). Control is returned to the operation at step S109 if it is determined that the film 4 has not been wound by one frame. If it is determined that the film 4 has been wound by one frame, the film winding motor 57 is stopped (S111). Note that if the film loading flag FS is 0 (FS=0) after the exposure operation (S105), film has not been loaded, and hence, the film winding operation to reduce the power consumption of the battery is not carried out.

If the main switch 14 is ON (S112), the control proceeds to step S200 (loading operation). As mentioned above, if the loading operation has been completed, the control skips the loading operation and proceeds to the photographing operation for the next film frame.

If the back-lid switch 18 is turned OFF from ON at step S103, i.e., if the back lid 16 is open, whether both the photo-reflectors 35 and 45 are turned OFF is checked to determine whether the photographing operation for all the film frames has been completed, so that the film has been unloaded (S113). If both the photo-reflectors 35 and 45 are OFF, the film loading flag FS, the loading completion flag FL, and the winding direction flag FW are all set to zero (FS=0, FL=0 and FW=0) (S114, S115 and S116). Also, the pulse count C=0 is set (S117), and the control is returned to the loading operation S200.

When the control is returned to the loading operation S200, if one or both of the photo-reflectors 35 and 45 is/are ON, the film is loaded; and hence, the operations at steps S103 and S113 are repeated until the film is unloaded. Consequently, if the back lid 16 is opened and is closed again without removing the film, it is possible to prevent the control circuit 60 from incorrectly judging that a new film is loaded and from carrying out the photographing operation for the exposed film. Moreover, if the main switch 14 is turned OFF at step S112, the control circuit 60 stores the values of the flags FS, FL and FW, and the counted number C of pulses (S118) in the EEPROM 61.

Figure 11:
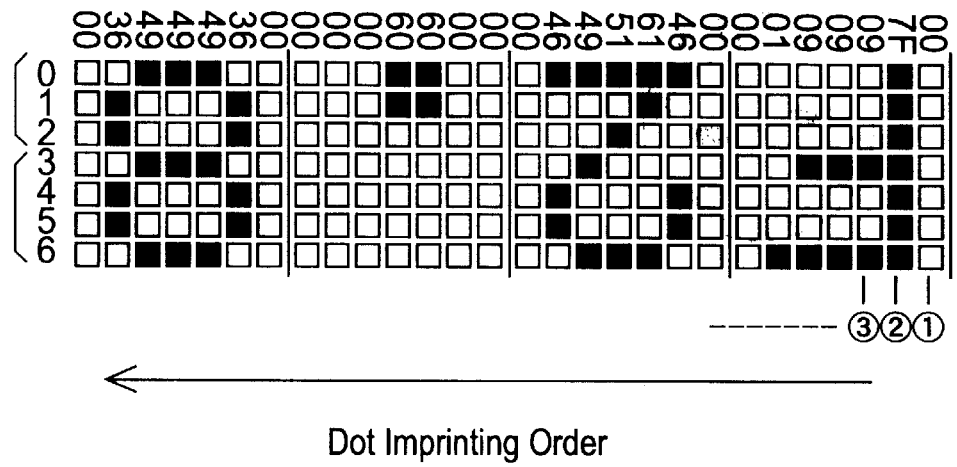
FIG. 11 is an explanatory view which illustrates an arrangement of dots imprinted on a film when the dots are imprinted while the film is wound in the direction shown by an arrow "B" in FIG. 17.
Figure 12:
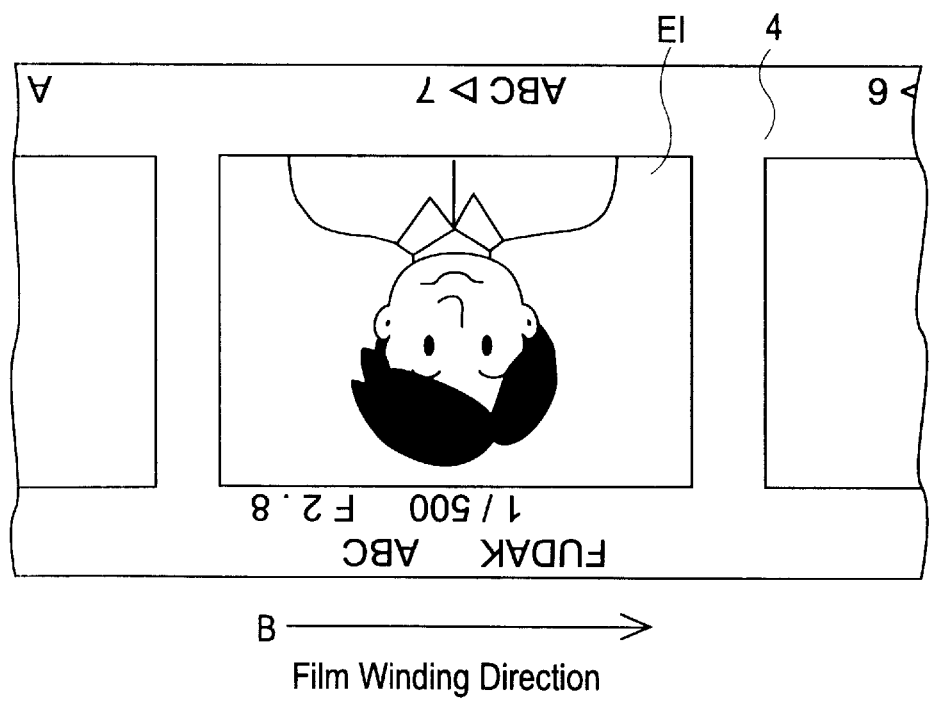
FIG. 12 is a plan view of part of a roll-film on which the photographic data "1/500 F.2.8" is imprinted in the case where the photographic data is imprinted according to the arrangement shown in FIG. 11 while the film is wound in the direction shown by an arrow "B" in FIG. 17.

As may be understood from the above discussion, in the illustrated embodiment, a new roll-film loaded into the spool compartment 30 or 40 is detected, and whether the winding direction of the film 4 is the direction "A" (shown in FIG. 3) or "B" (shown in FIG. 4) is detected. With these results of detection, the corresponding data table "A" or "B" is selected from the ROM 65, and the photographic data which is to be imprinted is read out of the selected data table "A" or "B". In accordance with the photographic data read out of the selected data table "A" or "B", the photographic-data imprinting operation is carried out with the data-imprinting light emitter 24 by actuating the light emitter 71. Such a control makes it possible to correctly imprint photographic data on each frame when the film 4 is wound in either film winding direction "A" or "B". For example, in the case where the photographic data "1/500 F2.8" is imprinted while the film 4 is wound in the direction "B" from the first spool compartment 30 to the second spool compartment 40 as shown in FIG. 4, data of each character of "1/500 F2.8" is selected from the second data table "B" prestored in the ROM 65 to be subsequently registered in a register (not shown) character by character as photographic data to be imprinted. With this operation, the data of inverted characters to be imprinted are registered in the register as shown in FIG. 11. Using this data of inverted characters, the matrix-array of square dots which together form the characters which are to be imprinted are sequentially imprinted by ON/OFF emissions of the seven LEDs D0 through D6 from the right end ① shown in FIG. 11 of the matrix-array of square dots to the left end thereof. The ON/OFF emissions of the seven LEDs D0 through D6 are synchronized with the feeding speed of the film 4 in the direction "B". Note that the seven dots (0 through 6) are divided into two groups: a 3-dot group (0 through 2) and a 4-dot group (3 through 6). Each dot group (constituting a total of seven dots 0 through 6) is represented by hexadecimal notation (though the 3-dot group is only represented by the numbers 0 through 7). In FIG. 11, the hexadecimal digit codes are respectively written above the corresponding arrays of seven dots (0 through 6). Accordingly, the photographic data is prestored in the ROM in the form of hexadecimal notation. Consequently, as shown in FIG. 12, the inverted characters "1/500 F2.8" are imprinted on the film 4 to correspond to the corresponding exposed image EI so that the characters "1/500 F2.8" are imprinted immediately above the corresponding exposed image EI when the exposed image EI is viewed as an erect image (i.e., when the image shown in FIG. 12 is viewed upside down). Specifically, the inverted characters "1/500 F2.8" are imprinted on the film 4 below the corresponding exposed image EI along its lower lateral edge from about the center to the right thereof when the exposed image EI is viewed from the back of the film 4 shown in FIG. 12. Therefore, when one puts the developed film strips in order with the photographed images thereof seen in the erect position, the imprinted photographic data can be seen also in the erect position because for each frame the photographic data is imprinted above the exposed image EI along its upper lateral edge from substantially the center to the left thereof as the exposed image EI is viewed from the back of the film 4 shown in FIG. 12.

Figures 13, 14:
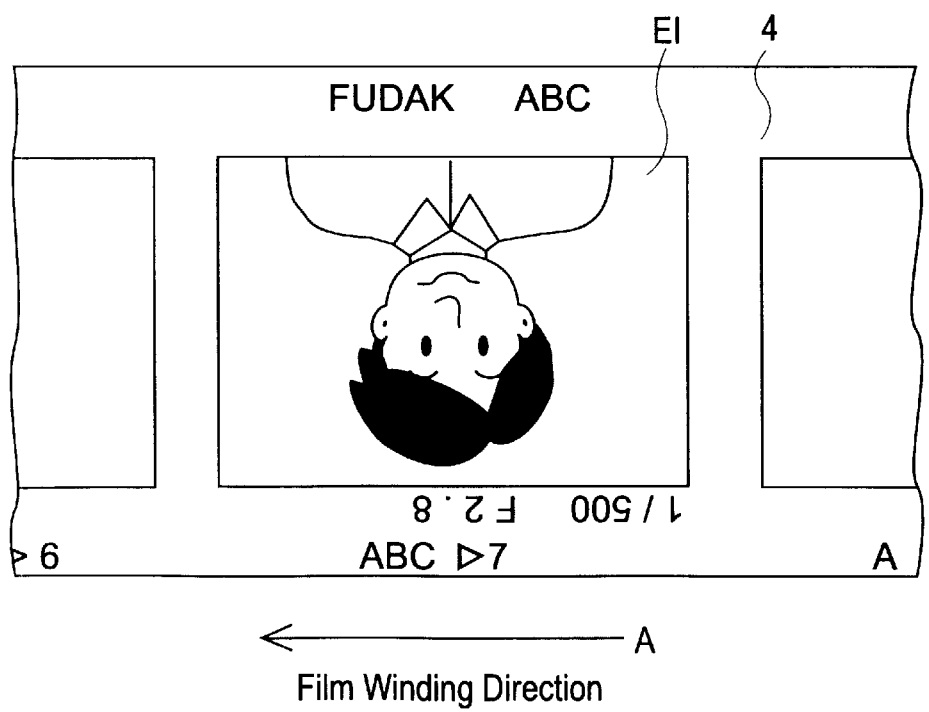
FIG. 13 is an explanatory view which illustrates an arrangement of dots imprinted on a film when the dots are imprinted while the film is wound in the direction shown by an arrow "A" in FIG. 17.
FIG. 14 is a plan view of part of a roll-film on which the photographic data "1/500 F.2.8" is imprinted in the case where the photographic data is imprinted according to the arrangement shown in FIG. 13 while the film is wound in the direction shown by an arrow "A" in FIG. 17.

Conversely, in the case where the photographic data "1/500 F2.8" is imprinted while the film 4 is wound in the direction "A" from the second spool compartment 40 to the first spool compartment 30 as shown in FIG. 3, data of each character of "1/500 F2.8" is selected from the first data table "A" prestored in the ROM 65 to be subsequently registered in the aforementioned register character by character as photographic data to be imprinted. With this operation, the data of the inverted characters to be imprinted are registered in the register as shown in FIG. 13. Using this data of inverted characters, the matrix-array of square dots which together form the characters which are to be imprinted are sequentially imprinted by ON/OFF emissions of the seven LEDs D0 through D6 from the left end ① shown in FIG. 13 of the matrix-array of square dots to the right end of the same (this order is opposite to the order shown in FIG. 11) while the ON/OFF emissions of the seven LEDs D0 through D6 are synchronized with the feeding speed of the film 4 in the direction "A". Consequently, as shown in FIG. 14, the inverted characters "1/500 F2.8" are imprinted on the film 4 to correspond to the corresponding exposed image EI so that the characters "1/500 F2.8" are imprinted immediately above the corresponding exposed image EI when the exposed image EI is viewed as an erect image (i.e., when the image shown in FIG. 14 is viewed upside down). Specifically, the inverted characters "1/500 F2.8" are imprinted on the film 4 below the corresponding exposed image EI along its lower lateral edge from about the center to the left thereof as the exposed image EI is viewed from the back of the film 4 shown in FIG. 14. Therefore, when one puts the developed film strips in order with the photographed images thereof seen in the erect position, the imprinted photographic data can be seen also in the erect position because for each frame the photographic data is imprinted above the exposed image EI along its upper lateral edge from about the center to the right thereof as the exposed image EI is viewed from the back of the film 4 shown in FIG. 14.

Figure 20:
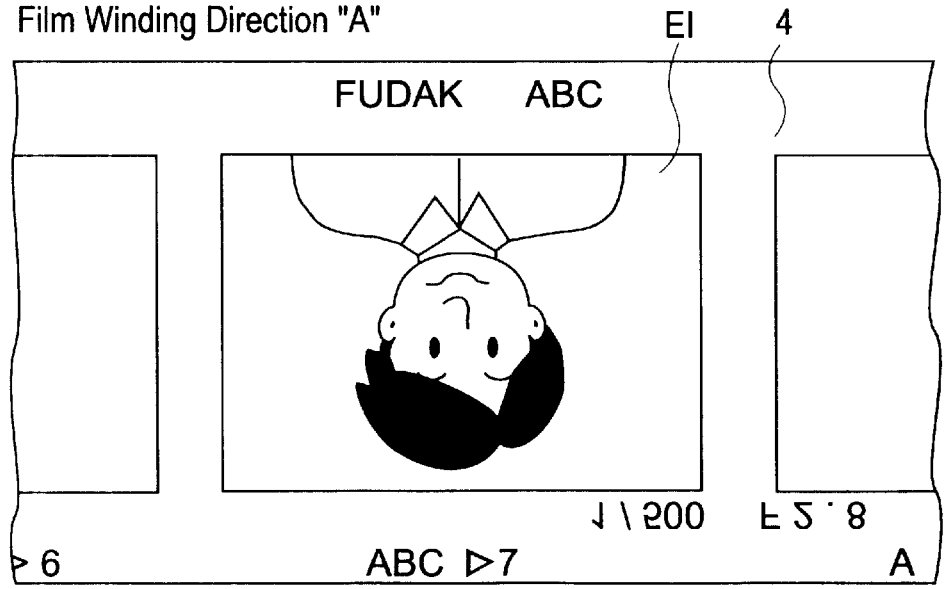
FIG. 20 is a plan view of part of a roll-film on which the photographic data "1/500 F.2.8" is imprinted while the film is reversely wound in the direction opposite to the predetermined film winding direction in the case shown in FIG. 19.

As can be understood from the foregoing, although the photographic data is imprinted at either one of the two different positions (i.e., the photographic data is imprinted along the upper lateral edge of the exposed image EI from substantially the center to either the right or the left as the exposed image EI is viewed as an erect image) for each exposed frame on the film 4 in accordance with the selected film feeding direction "A" or "B", the photographic data imprinted as an erect image can be seen above the corresponding exposed image on each frame, so that the problem such as shown in FIG. 20 wherein the photographic data does not extend over two adjacent frames. In the illustrated embodiment, since the photographic data starts to be imprinted on each frame from substantially the median thereof in the film feeding direction, the photographic data is reliably imprinted above the corresponding exposed image on each frame if the span of the imprinted photographic data is predetermined to be less than one half of the lateral length of each frame. This prevents the photographic data from being imprinted over two adjacent frames. Hence, it is easy to tell which photographic data belongs to which exposed frame.

Figure 15:
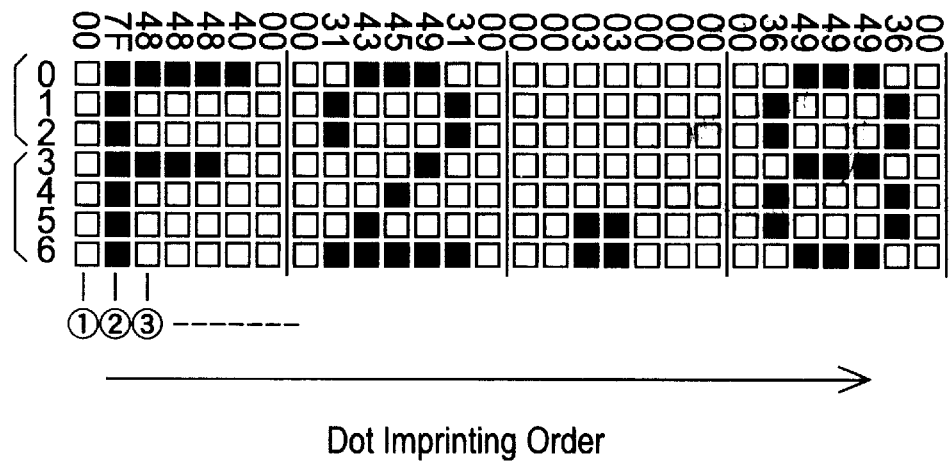
FIG. 15 is an explanatory view which illustrates another arrangement of dots imprinted on a film when the dots are imprinted while the film is wound in the direction shown by an arrow "A" in FIG. 17.
Figure 16:
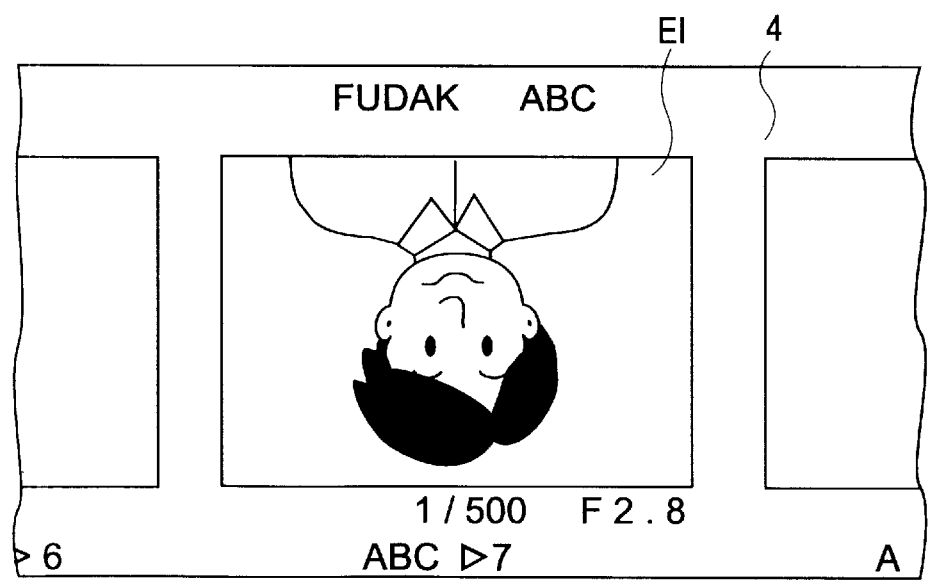
FIG. 16 is a plan view of part of a roll-film on which the photographic data "1/500 F.2.8" is imprinted according to the arrangement shown in FIG. 15 in the case where the photographic data is imprinted while the film is wound in the direction shown by an arrow "A" in FIG. 17.
Figure 17:
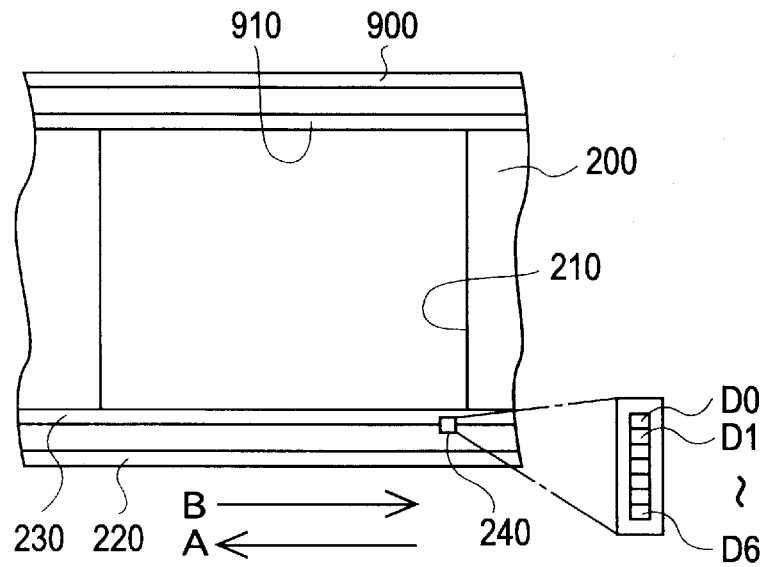
FIG. 17 is a fragmentary plan view of a roll-film camera which is provided with a photographic-data imprinting device having a data-imprinting light emitter, illustrating a basic structure thereof.
Figure 18:
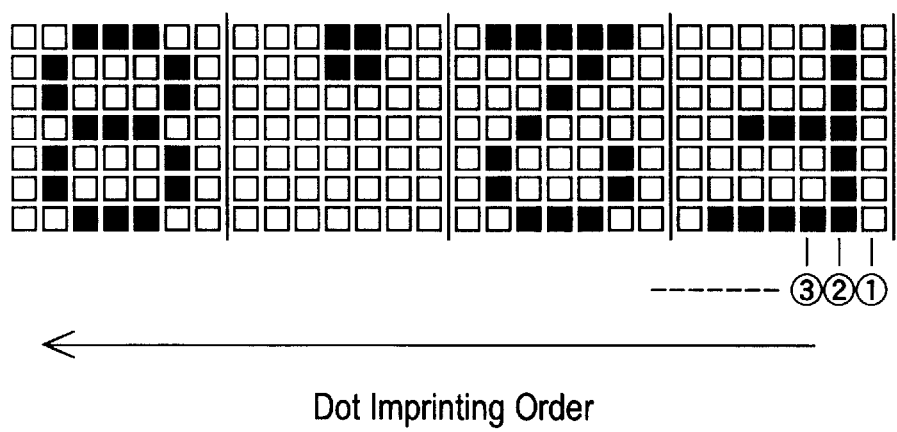
FIG. 18 is an explanatory view which illustrates an arrangement of dots imprinted on a film by the data-imprinting light emitter shown in FIG. 17.
Figure 19:
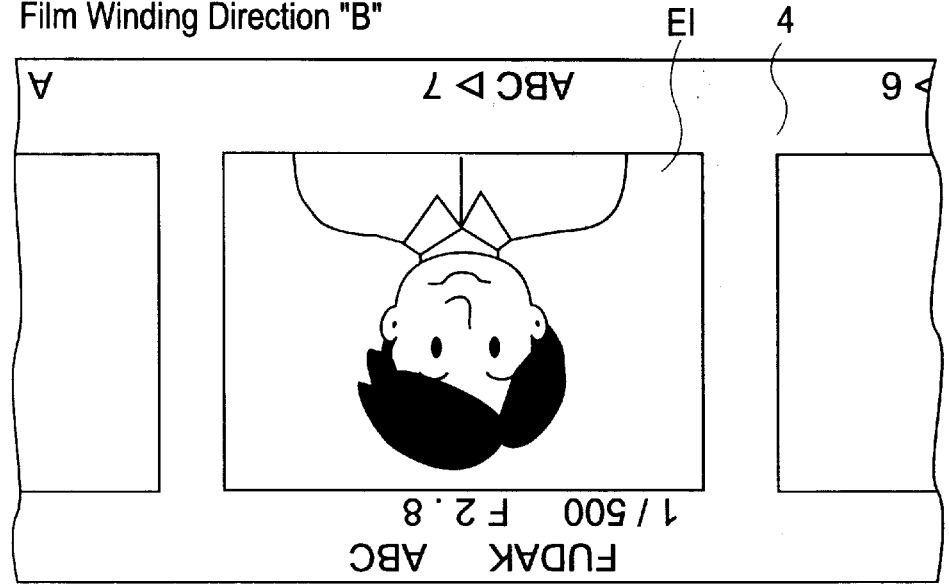
FIG. 19 is a plan view of part of a roll-film on which the photographic data "1/500 F.2.8" is imprinted while the film is wound in a predetermined film winding direction, according to a conventional roll-film camera having a photographic-data imprinting device.

The camera of the present embodiment can be modified so that the photographic data is always imprinted in the erect position on each frame with respect to the frame number thereof which is previously imprinted on the film, regardless of the film winding direction. For instance, in the particular case shown in FIG. 12 where the photographic data "1/500 F2.8" is imprinted on the film 4 in the erect position with respect to the frame number "7" while the film 4 is wound in the direction "B", the photographic data will be imprinted on the film 4 like that shown in FIG. 14 where the same photographic data is imprinted upside-down with respect to the frame number "7" if the photographic data is imprinted on the film 4 while the film 4 is wound in the other direction "A". If it is required in the case shown in FIG. 14 that the photographic data should be imprinted on the film 4 in the erect position with respect to the frame number "7" while the film 4 is wound in the direction "A", he first data table "A" needs to be arranged in a manner as shown in FIG. 15. This arrangement shown in FIG. 15 is an inverted arrangement of that shown in FIG. 13. Using this data of characters shown in FIG. 15, the matrix-array of square dots which together form the characters which are to be imprinted are sequentially imprinted by ON/OFF emissions of the seven LEDs D0 through D6 from the left end ① of the matrix-array of square dots to the right end of the same while the ON/OFF emissions of the seven LEDs D0 through D6 are synchronized with the feeding speed of the film 4 in the direction "A". Consequently, as shown in FIG. 16, the characters "1/500 F2.8" are imprinted on the film 4 in the erect position with respect to the frame number "7" below the corresponding exposed image EI along its lower lateral edge from about the center to the left thereof as the exposed image EI is viewed from the back of the film 4 shown in FIG. 16. Therefore, when one puts the developed film strips in order with the frame numbers thereof seen in the erect position, the imprinted photographic data can be seen also in the erect position, because for each frame the photographic data is imprinted below the exposed image EI along its lower lateral edge from substantially the center to the right thereof as shown in FIG. 16.

In the present embodiment of the camera, although each character of photographic data is constituted by a matrix of seven dots by seven dots (7×7), the present invention is not limited solely to such a specific arrangement.

Furthermore, photographic data can be imprinted on the film 4 in the erect position with respect to not only the frame number but also the exposed image regardless of the film winding direction.

Moreover, the camera can be provided, between the inner and outer guide rails at upper and lower vertical edges of the aperture 21, with two data-imprinting light emitters which are each similar to the data-imprinting light emitter 24 so that photographic data of a long span in the film feed direction can be imprinted on both sides of the corresponding frame. If two data-imprinting light emitters are provided, it is possible to selectively use either of the two light emitters depending on the film winding direction, and two data tables which correspond to the aforementioned first and second data tables "A" and "B" can be respectively provided for the two data-imprinting light emitters.

Although a commercially available Brownie film as a medium-sized film is used in the illustrated embodiment, the film to be used is not limited solely to a specific size. Namely, the present invention can be equally applied to any camera in which a spool separation type film can be used.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A roll-film camera for receiving a roll-film, comprising:
   a pair of spool compartments, each adapted to support a roll-film;
   a reversible film winding mechanism which rotates a spool placed in one of said pair of spool compartments when the roll-film is placed in the other of said pair of spool compartments to wind a film of said roll-film onto said spool, wherein a film winding direction of said reversible film winding mechanism can be reversed depending on which one of the first and second spool compartments the roll-film is loaded into;
   a photographic-data imprinting device adapted to imprint photographic data on the film of the roll-film; and
   a controller for controlling said photographic-data imprinting device to imprint said photographic data on the film of the roll-film, when the roll-film is loaded, in different arrangements depending on said winding direction of the film.

2. The roll-film camera according to claim 1, wherein said controller controls said photographic-data imprinting device to imprint said photographic data on the film of the roll-film when loaded, in either an erect or an inverted arrangement depending on the film winding direction.

3. The roll-film camera according to claim 1, further comprising a detector for detecting which of said first and second spool compartments the roll-film, when loaded, is placed into.

4. The roll-film camera according to claim 3, wherein said detector comprises first and second sensors positioned in said camera body to correspond to said first and second spool compartments, respectively.

5. The roll-film camera according to claim 1, wherein said photographic-data imprinting device comprises an array of light emitters which are aligned in a straight line extending in a direction perpendicular to the film winding direction,
   wherein said controller selectively actuates said array of light emitters adapted to emit light on the film of the roll-film when loaded, while synchronizing light emissions of said array of light emitters with the feeding speed of the film.

6. The roll-film camera according to claim 5, further comprising a memory for storing a first data table and a second data table, each comprising data of characters representing said photographic data,
   wherein said controller reads out said photographic data from said first and second data tables when the loaded roll-film is wound in a first film winding direction and a second film winding direction, respectively, said second film winding direction being opposite to said first film winding direction;
   wherein said array of light emitters emit light in accordance with said photographic data read out of either said first data table or said second data table.

7. The roll-film camera according to claim 6, wherein data of each character of said photographic data, in a first direction, of said first data table is stored in said memory in a first order; and wherein said data of each character of said photographic data, in a second direction, of said second data table is stored in said memory in a second order.

8. The roll-time camera according to claim 7, wherein said first and second data tables are stored in said memory; and
   wherein said photographic data of said first and second data tables is imprinted on the loaded film in an erect position and an upside-down position, respectively.

9. The roll-time camera according to claim 4, wherein said controller determines said film winding direction in accordance with results of detection of said first and second sensors, wherein said film winding mechanism rotates said spool to feed the loaded film from one of said pair of spool compartments in which said roll-film is placed to the other of said spool compartments in which said spool is placed.

10. The roll-film camera according to claim 1, wherein said film winding mechanism comprises a motor having a drive shaft adapted to be driven in forward and reverse rotational directions to wind the loaded roll-film between said pair of spool compartments is first and second directions, respectively.

11. The roll-film camera according to claim 1, wherein said film winding mechanism further comprises a planetary gear mechanism.

12. The roll-film camera according to claim 1, wherein said photographic data comprises at least one of the following: date of photography, shutter-speed, exposure value and the focal-length.

13. The roll-film camera according to claim 5, wherein said camera comprises a camera body having an aperture which forms the limits of each frame of the film exposed,
   wherein said camera body comprises a through-hole formed outside of said aperture and in the close vicinity of said aperture on a lower lateral side thereof; and
   wherein said array of light emitters emit light to said film through said through-hole to imprint said photographic data on the film of the loaded roll-film.

14. The roll-film camera according to claim 13, wherein said photographic-data imprinting device further comprises a prism.

15. A roll-time camera for receiving a roll-film, comprising:
   a pair of spool compartments, each adapted to support a roll-film;
   a reversible film winding mechanism which rotates a spool placed in one of said pair of spool compartments when the roll-film is loaded in the other of said spool compartments to wind a film of the loaded roll-film onto said spool;
   a photographic-data imprinting device adapted to imprint photographic data on the film; and
   a controller for controlling said photographic-data imprinting device to imprint said photographic data on the film of the loaded roll-film in a manner so that characters or symbols of photographing data are correctly recorded in a same direction, regardless of a winding direction of the loaded roll-film, when viewed from the front side or reverse side of the film.

16. A roll-film camera for receiving a roll-film, comprising:
a pair of spool compartments, each adapted to support a roll-film;
a reversible film winding mechanism which rotates a spool placed in one of said pair of spool compartments when the roll-film is loaded in the other of said spool compartments to wind a film of the loaded roll-film onto said spool;
a photographic-data imprinting device adapted to imprint photograph data on the film; and
a controller for controlling said photographic-data imprinting device to imprint said photographic data on the film of the loaded roll-film within a predetermined area which correctly corresponds to each frame to be exposed on the loaded film regardless of the winding direction of the loaded film.

* * * * *